US010359913B2

United States Patent
Nomura et al.

(10) Patent No.: US 10,359,913 B2
(45) Date of Patent: Jul. 23, 2019

(54) INTERFACE FOR CREATING AND COMPARING MULTIPLE OBJECT SETS

(71) Applicant: International Business Machines Corporation, Armonk, NY (US)

(72) Inventors: Yuka Nomura, Tokyo (JP); Naomi Zenge, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 15/368,780

(22) Filed: Dec. 5, 2016

(65) Prior Publication Data
US 2018/0157382 A1 Jun. 7, 2018

(51) Int. Cl.
G06F 3/0482 (2013.01)
G06F 3/0488 (2013.01)
G06F 3/0484 (2013.01)
G06F 3/0486 (2013.01)
G06F 3/0481 (2013.01)

(52) U.S. Cl.
CPC .......... G06F 3/0482 (2013.01); G06F 3/0484 (2013.01); G06F 3/0486 (2013.01); G06F 3/0488 (2013.01); G06F 3/04817 (2013.01)

(58) Field of Classification Search
CPC .................................................. G06F 3/0482
USPC ....................................................... 715/804
See application file for complete search history.

(56) References Cited

U.S. PATENT DOCUMENTS

| 7,761,800 B2* | 7/2010 | Chaudhri ............... B60K 35/00 715/764 |
| 9,600,146 B2* | 3/2017 | Cervelli ................. G06F 3/0482 |
| 2006/0015818 A1* | 1/2006 | Chaudhri .............. G06F 3/0481 715/779 |
| 2008/0030488 A1* | 2/2008 | Kobayashi .......... G06F 3/04892 345/204 |
| 2014/0053102 A1* | 2/2014 | Lee ........................ G06F 3/0482 715/810 |
| 2014/0115446 A1 | 4/2014 | Hall et al. |
| 2015/0089421 A1* | 3/2015 | Kagei ................... G06F 3/0488 715/769 |
| 2015/0339030 A1 | 11/2015 | Yuan et al. |
| 2015/0363062 A1 | 12/2015 | Gunn |
| 2016/0034827 A1* | 2/2016 | Morris ................. G06Q 10/109 705/5 |

(Continued)

FOREIGN PATENT DOCUMENTS

WO 2015039523 3/2015

*Primary Examiner* — William D Titcomb
(74) *Attorney, Agent, or Firm* — VanLeeuwen & VanLeeuwen; William J. Stock (57) ABSTRACT

An approach is provided in which in which an information handling system displays multiple objects on a primary display layer (first display layer) of a display. The information handling system receives a selection of a first one of the objects and displays the first object on a second display layer of the display accordingly that is different than the primary display layer. Next, the information handling system receives a selection of a second one of the objects and displays the second object on a third display layer of the display that is different than the second display layer. In turn, the information handling system performs an action on the first object subsequent to displaying the second object on the second display layer.

20 Claims, 10 Drawing Sheets (56) References Cited

U.S. PATENT DOCUMENTS

2017/0052747 A1* 2/2017 Cervelli ................ G06F 3/0482
2018/0046654 A1* 2/2018 Nomura ................ G06F 16/951

* cited by examiner

INTERFACE FOR CREATING AND COMPARING MULTIPLE OBJECT SETS

BACKGROUND

Today's graphical user interface (GUI) environments allow a user to select a set of objects, such as icons, pictures, files, etc., which are then virtually placed in a clipboard or moved to a temporary storage region corresponding to an application. While the objects are in the clipboard, the objects are viewed as a single set and the user may perform an operation on the object set (delete, move, etc.) or cancel the object set to discard the objects from the clipboard. The GUI requires the user to discard the objects before allowing the user to establish a new object set in the clipboard, which prohibits the user from comparing an old object set with a new object set.

BRIEF SUMMARY

According to one embodiment of the present disclosure, an approach is provided in which an information handling system displays multiple objects on a primary display layer (first display layer) of a display. The information handling system receives a selection of a first one of the objects and displays the first object on a second display layer of the display accordingly that is different than the primary display layer. Next, the information handling system receives a selection of a second one of the objects and displays the second object on a third display layer of the display that is different than the second display layer. In turn, the information handling system performs an action on the first object subsequent to displaying the second object on the second display layer.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
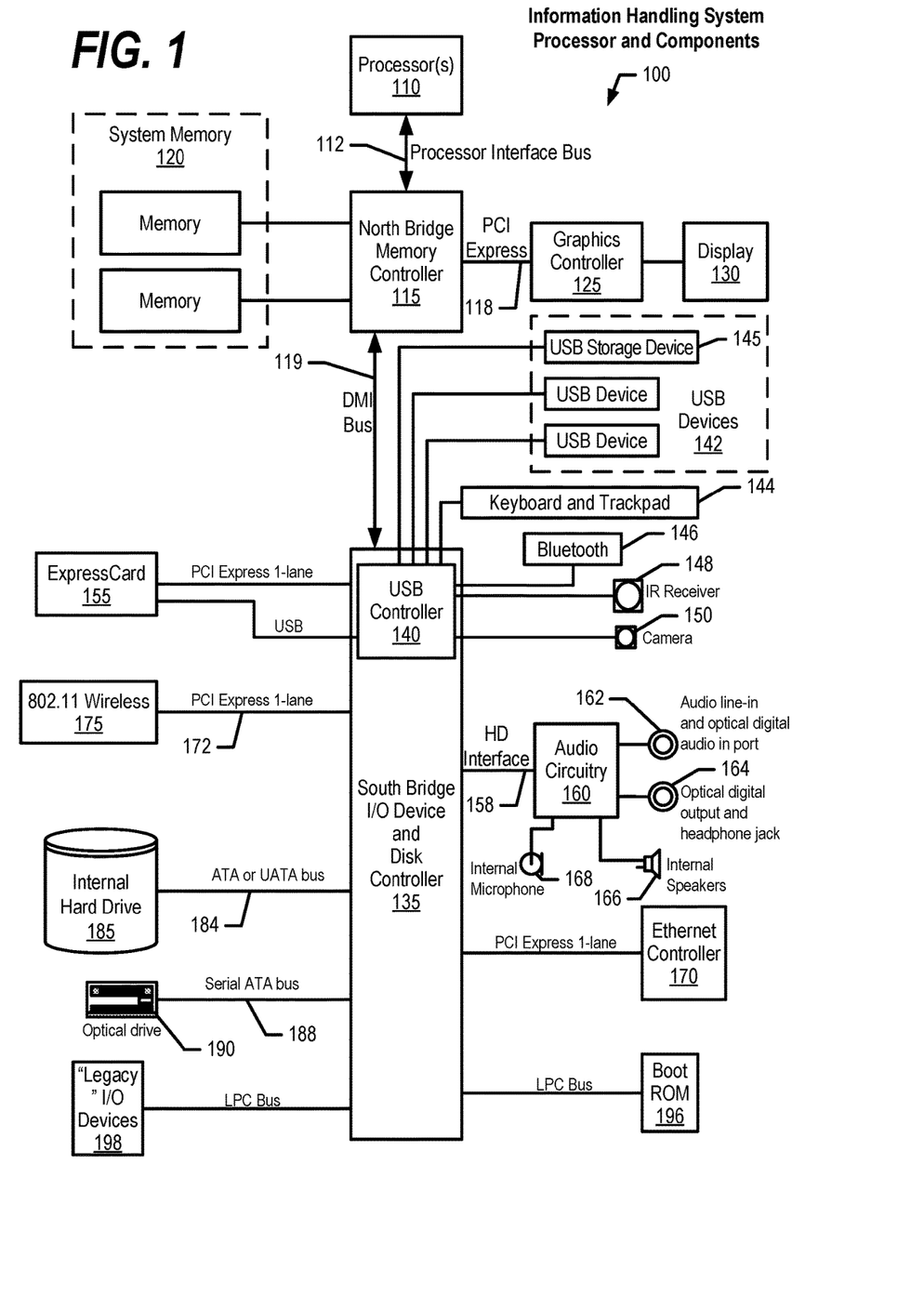
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
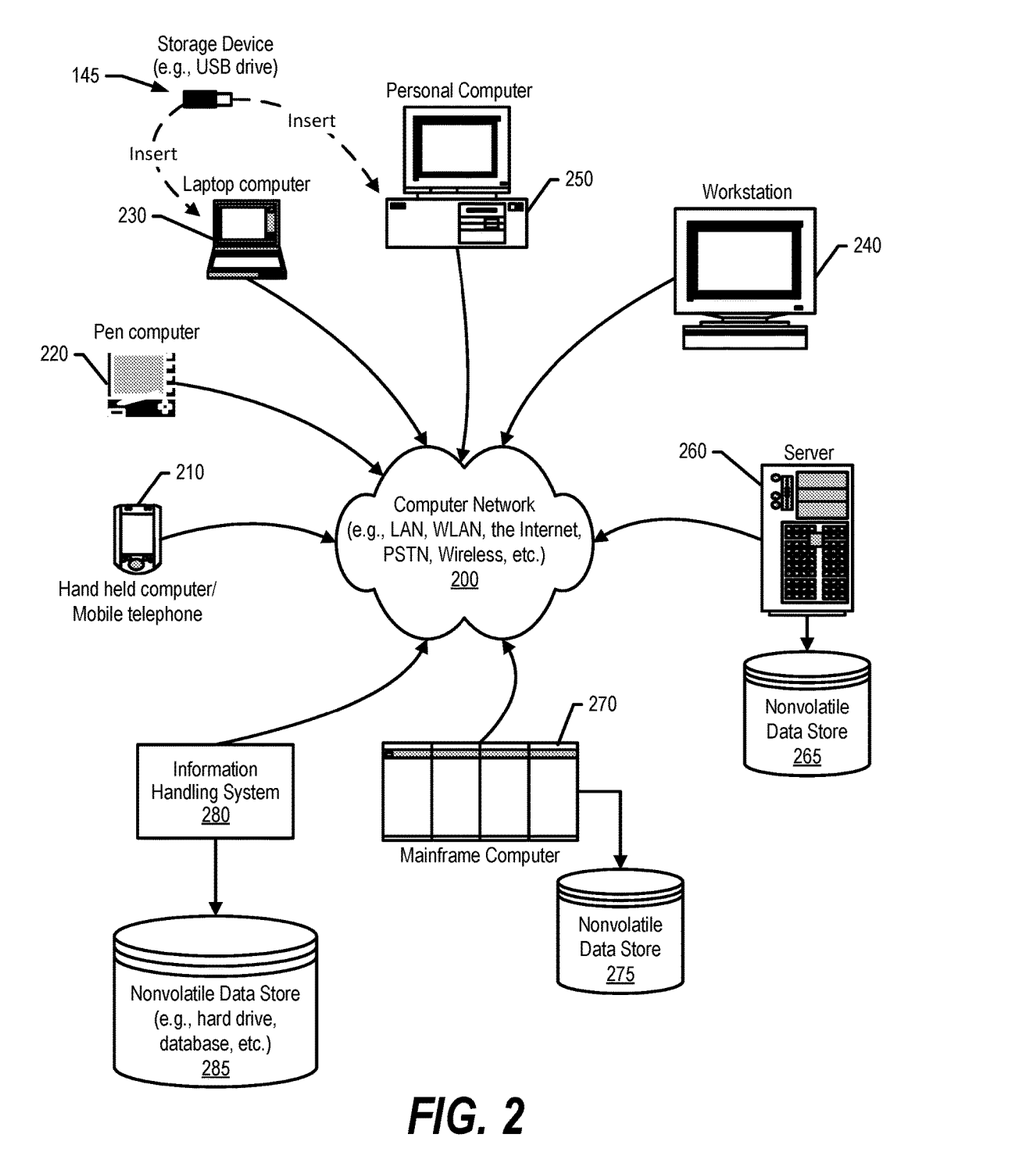
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 10 depict an approach that can be executed on an information handling system that enables a GUI interface to compare and perform actions on object sets. The information handling system discussed herein allows a user to establish multiple object sets within multiple object set layers and perform operations on the object set layers accordingly. The information handling system displays multiple objects on a primary layer (display layer) of a display. The information handling system detects user-initiated "pick-up" gestures for the objects displayed on the primary layer, and the information handling system registers (e.g., copy, move, etc.) the objects to a particular object set layer (object set display layer). The user may move multiple objects to different object set layers to establish multiple object set layers. The object set layers, in one embodiment, are superimposed over the primary layer of the display and a user may toggle between the different object set layers to compare their corresponding object sets. In turn, the user may determine an action to perform on one of the object sets based on comparing the different object sets with each other.

Figure 3:
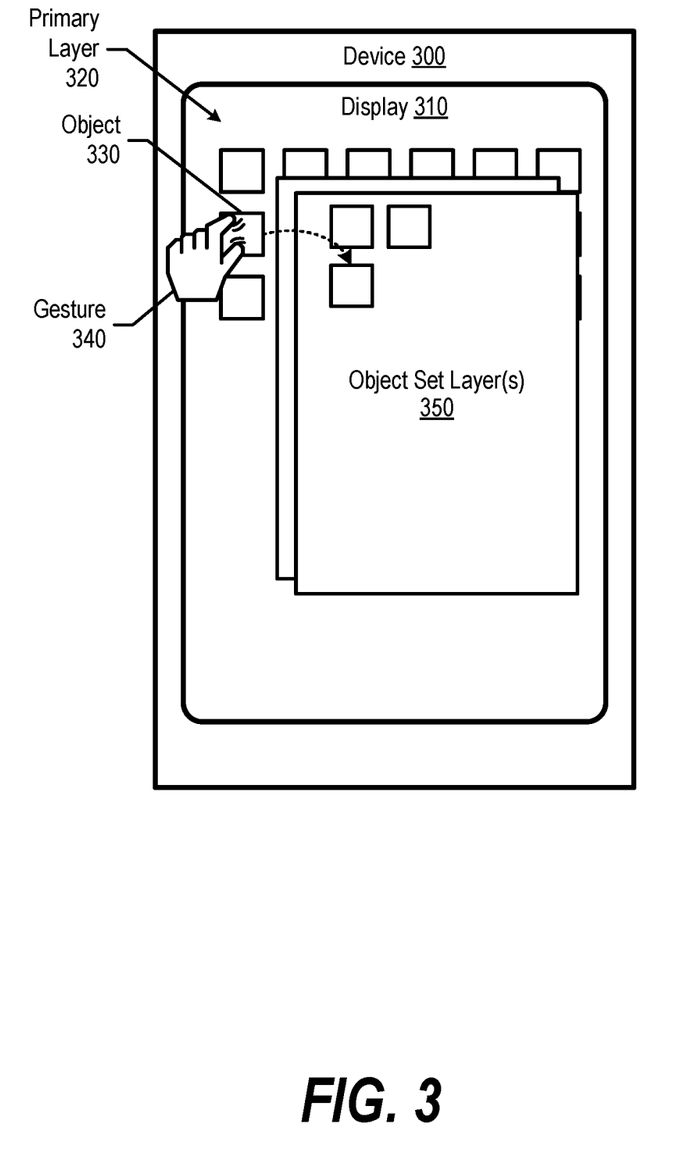
FIG. 3 is a diagram depicting a device that enables a user to register objects to different object set layers on a display and perform operations on objects on a per-layer basis.

FIG. 3 is a diagram depicting a graphical user interface (GUI) installed on a device that enables a user to register objects to different object set layers and perform operations on objects on a per-layer basis. Device 300 is an information handling system that includes display 310 to display objects on primary layer 320. For example, device 300 maybe a mobile phone and primary layer 320 may be a default user interface window that displays pictures or corresponding icons on display 310. As discussed in more detail below, when a user selects an object using a particular gesture (gesture 340), device 300 registers (e.g., copies, moves, etc.) the selected object to an object set layer 350 that is different than primary layer 320. In one embodiment, object set layer(s) 350 may be partially transparent and superimposed over primary layer 320. Each object set layer(s) 350 may be temporary storage regions that store multiple objects (e.g., icons), and performing an operation on an object set layer causes objects within the object set layer to be operated on together.

Gesture 340 may be a "pick up" operation to register an object with an object set layer. In one embodiment, the pick-up operation is finger gestures that simultaneously press on two contact points in an icon drawing region and brings the two contact points closer toward the center direction (e.g. pinch fingers together to pick-up the object). Device 300 may display a pop-up window on display 310 after detecting gesture 340 that provides options for the user to select (move, copy, etc.). In another embodiment, a user may pick-up multiple objects by performing the pick-up gesture to multiple objects within an object selection time (e.g., one second later) and device 300 registers the multiple objects to an object set layer (see FIGS. 5, 6, and corresponding text for further details).

In yet another embodiment, device 300 may generate multiple object set layers based on a number of times that the user performs gesture 340 on an object. For example, a user may perform two pick-up gestures on an object to instruct device 300 to register the object to a second layer (see FIG. 6 and corresponding text for further details). When the user establishes multiple object set layers, the user may compare the different object set layers and perform an action on one of the object set layers while the other object set layers are displayed (see FIGS. 7, 8, and corresponding text for further details).

Figure 4:
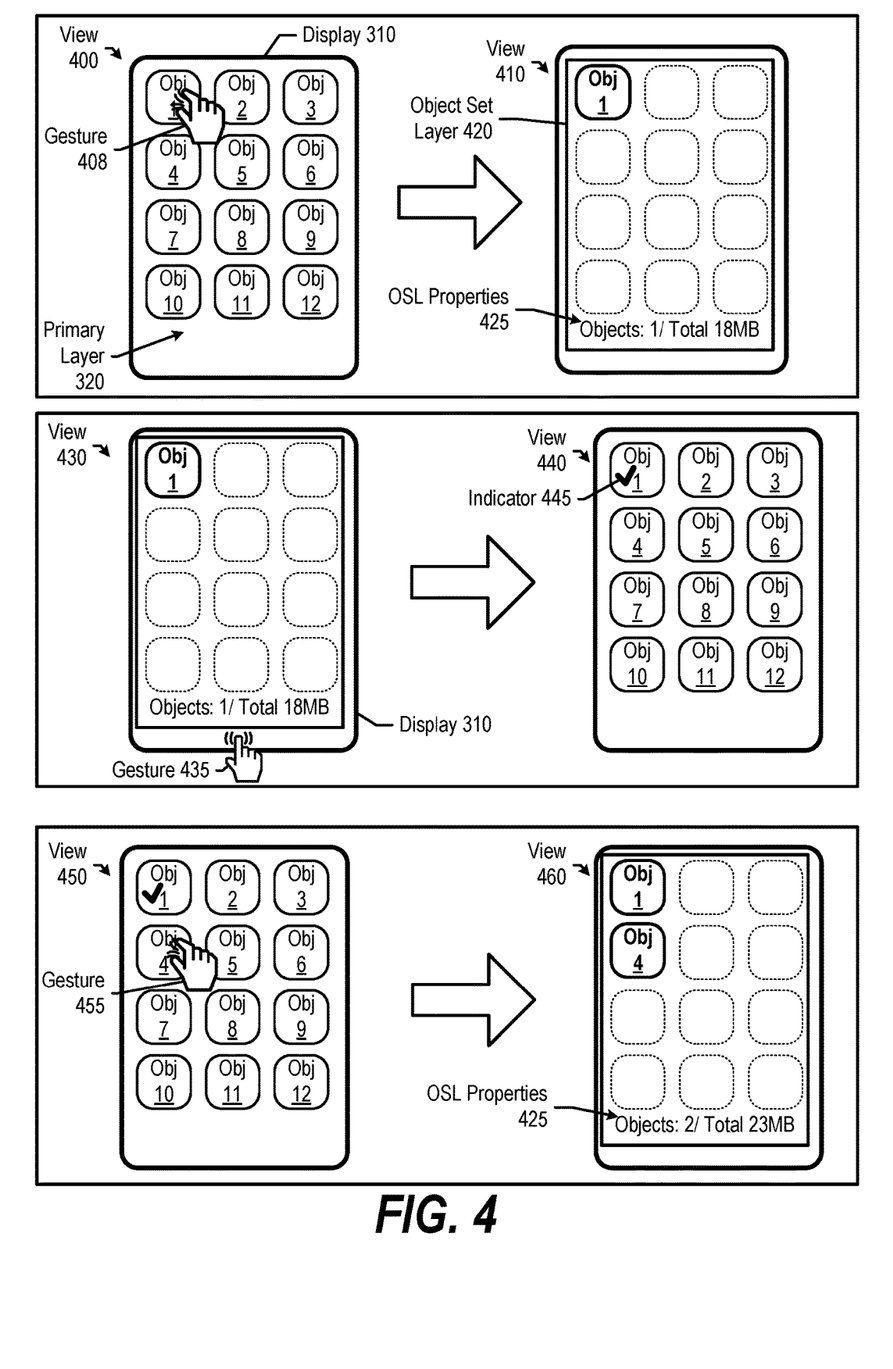
FIG. 4 is a diagram depicting various object selections and resultant views on a device's display.

FIG. 4 is a diagram depicting various object selections and resultant views on device 300's display 310. View 400 shows twelve objects (e.g., pictures, icons, etc.) displayed on primary layer 320, which are object 1, object 2, object 3, object 4, object 5, object 6, object 7, object 8, object 9, object 10, object 11, and object 12. When a user performs pick-up gesture 408 on object 1, device 300 registers object 1 to an object set layer and displays the object set layer (shown in view 410). View 410 shows object set layer 420 superimposed over primary layer 320 and includes object 1. In one embodiment, picked-up objects are displayed on an object set layer at locations relative to their locations on the primary layer, which allows a user to quickly evaluate the objects in a given object set layer. Object set layer 420 also includes object set layer properties 425, which show that object set layer 420 includes one object (object 1) that is 18 MB.

When a user wishes to return to primary layer 320 and view the other objects, the user may tap outside of object set layer 420, which is shown as gesture 435 in view 430. Device 300 then hides object set layer 420 and displays primary layer 320 (view 440). View 440 shows that, in one embodiment, device 300 provides indicator 445 on objects that have been registered to an object set layer. In another embodiment, the indicators may also indicate which object set layer to which the object is registered (object set layer "1", "2", etc.).

When a user wishes to add an object to an already established object set layer, the user performs pick-up gesture 455 (view 450) to register the object to the object set layer (view 460). In one embodiment, the user may perform multiple pick-up gestures on a single object to register the object to a particular object set layer (e.g., two pick up gestures registers the object to a second object set layer, see FIG. 6 and corresponding text for further details). View 460 shows that device 300 adjusts object set layer properties 425 accordingly based on the newly added object 4.

Figure 5:
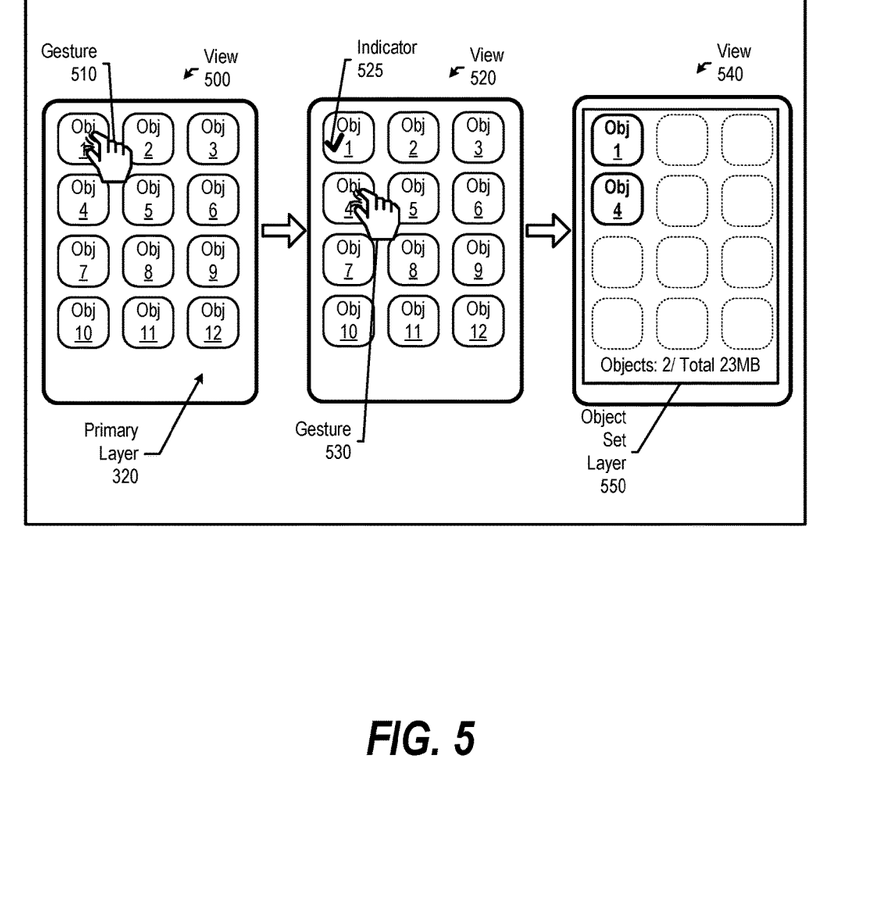
FIG. 5 is a diagram depicting a user registering multiple objects to an object set layer within an object selection time.

FIG. 5 is a diagram depicting a user registering multiple objects to an object set layer within an object selection time. In one embodiment, a user may pick-up multiple objects within a certain timeframe (object selection time) and have the multiple objects registered to the same object set layer. View 500 shows a user performing pick-up gesture 510 on object 1, and view 520 shows the user performing pick-up gesture 530 on object 4 within the object selection time (e.g., one second). In turn, view 540 shows that device 300 creates object set layer 550, which is superimposed over primary layer 320 and includes object 1 and object 4. In one embodiment, the user may select multiple objects and then perform the pick-up gesture. For example, the user may select objects 1, 3, and 6, and then perform a pick-up gesture anywhere on the screen to register the selected objects 1, 3, and 6 to an object set layer.

Figure 6:
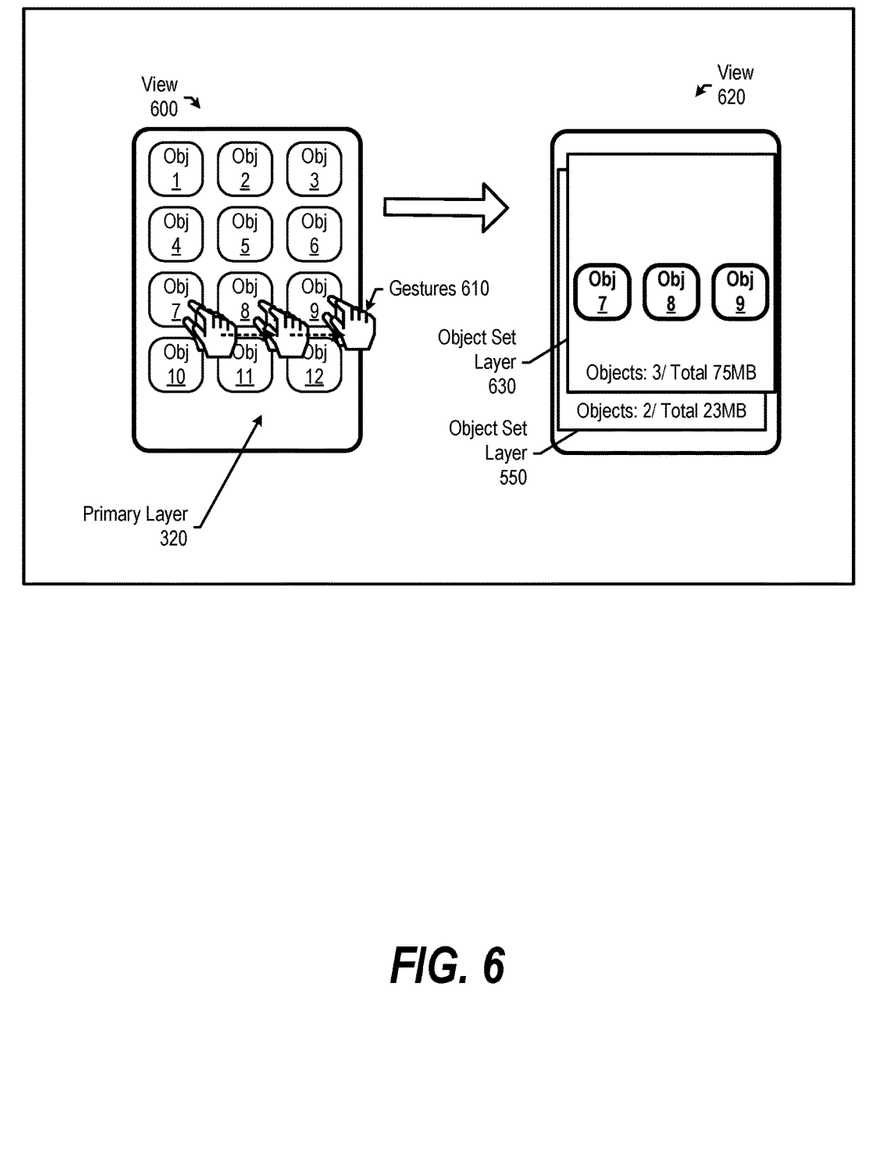
FIG. 6 is a diagram depicting a user performing multiple pick-up gestures on multiple objects to register the objects to a specific layer.

FIG. 6 is a diagram depicting a user performing multiple pick-up gestures on multiple objects to register the objects to a specific layer. FIG. 6 shows an embodiment where a user performs multiple pick-up gestures on objects to register each of the objects to a particular object set layer. For example, if a user performs a pick-up gesture two times in a row on the same object, the object is registered with the second object set layer.

View 600 shows that the user performs pick-up gestures 610 on primary layer 320, which includes two pick-up gestures on each of objects 7, 8, and 9. As a result, view 620 shows that device 300 creates a second object set layer 630 that includes objects 7, 8, 9, and corresponding object set layer properties showing three objects at 75 MB. In one embodiment, object set layer 630 is overlaid object set layer 550 (created in FIG. 5). When two object set layers are displayed, a user may toggle between the different object set layers and compare the objects and/or perform actions accordingly (see FIGS. 8, 8, and corresponding text for further details).

In one embodiment, the user may perform an "open" gesture on an object to register the object to a different object set layer. In this embodiment, the open gesture may be opposite of the pick-up gesture where a user places two fingers on the object and "opens" the fingers (spreads the fingers apart) to move the object to the next lower level (see FIG. 9 and corresponding text for further details). For example, the user may wish to move object 7 from object set layer 630 to object set layer 550. In this example, the user performs an open gesture on object 7 and object 7 is moved (deregistered) from object set layer 630 down to object set layer 550 (registered).

Figure 7:
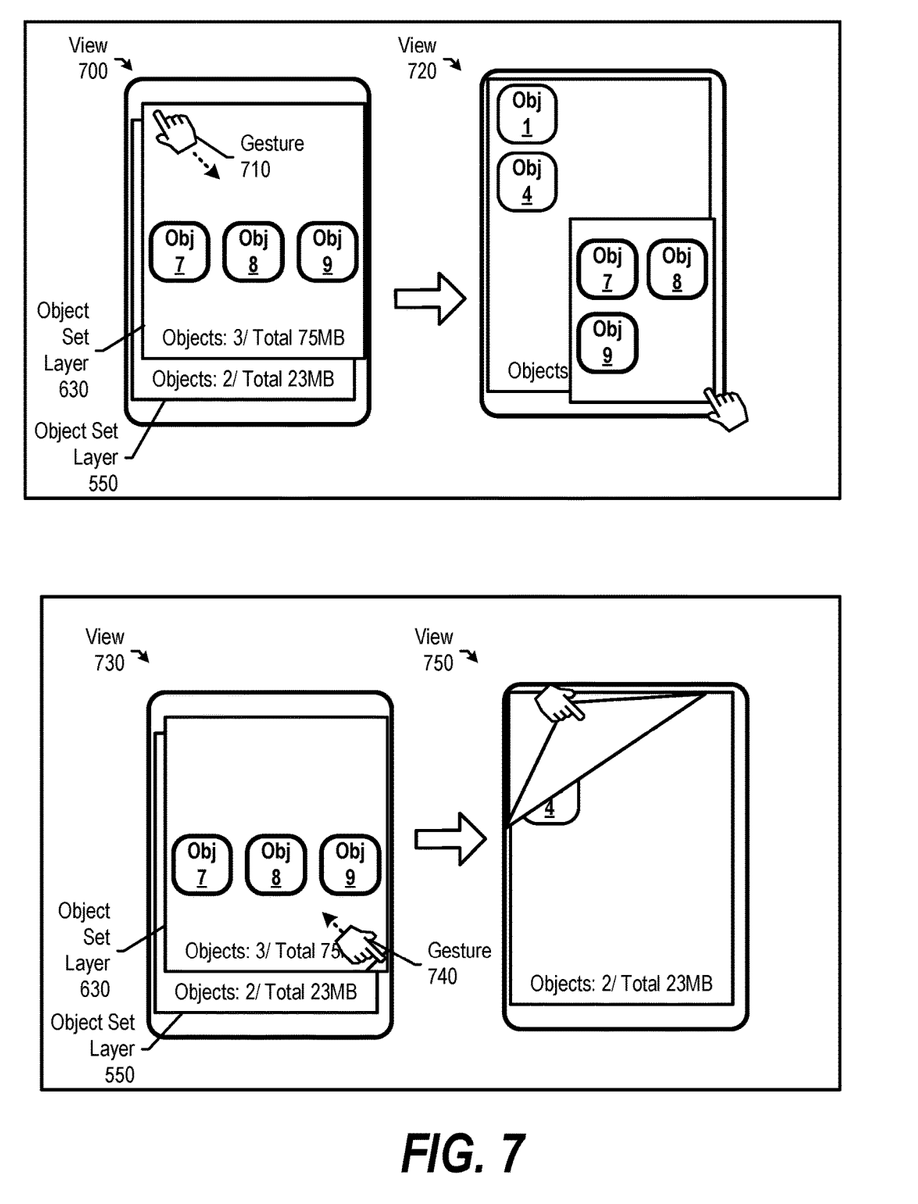
FIG. 7 is a diagram depicting various approaches to view and compare multiple object set layers and their corresponding object sets.

FIG. 7 is a diagram depicting various approaches to view and compare multiple object set layers and their corresponding object sets. View 700 shows object set layers 550 and 630. Object set layer 630 is superimposed over object set layer 550 and a user may perform layer reduction gesture 710 (e.g., move finger from upper right hand corner down to lower left hand corner) to reduce the size of object set layer 630 and view the contents of object set layer 550 underneath (view 720). When the user's finger is removed, object set layer 630 is repositioned as shown in view 700.

View 730 shows another approach to view object set layer 550 by performing layer lift gesture 740. In one embodiment, an icon (e.g., triangle) showing paper about to be turned over appears at the lower right corner of object set layer 630. When the user performs layer lift gesture 740 (e.g., move finger from lower right hand corner to upper left hand corner), device 300 "turns over" object set layer 630 and displays object set layer 550, shown in view 750.

Figure 8:
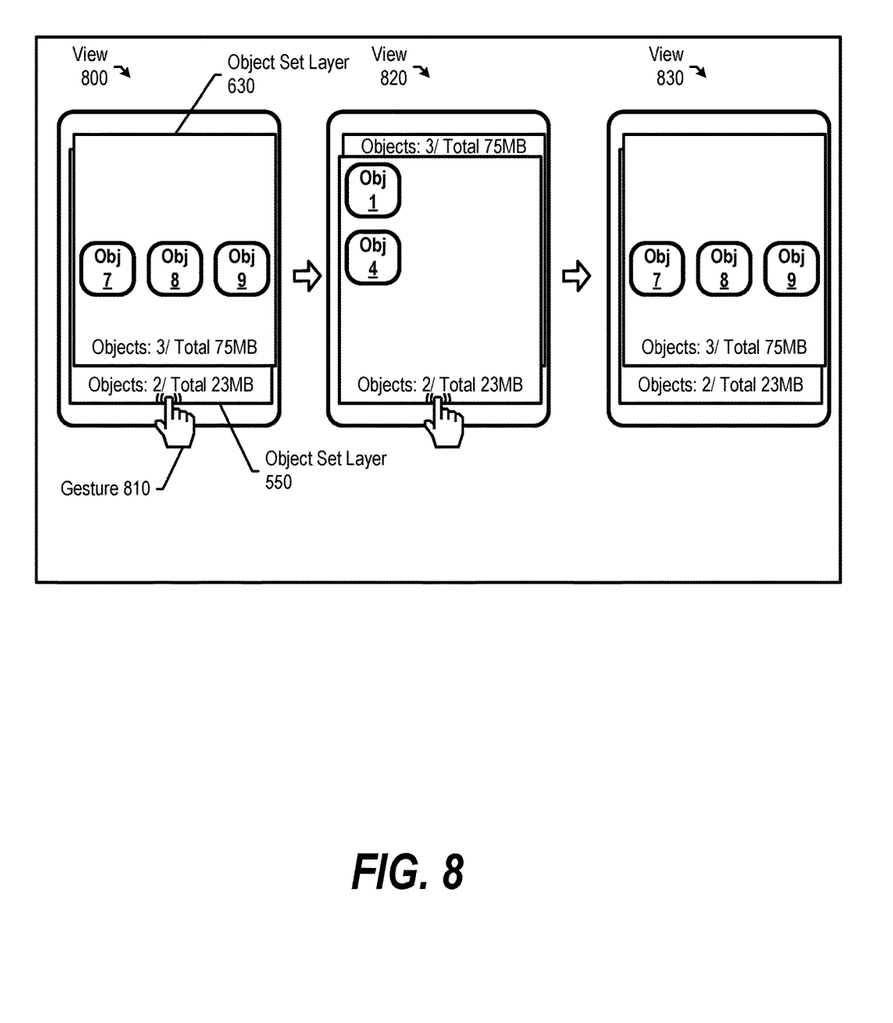
FIG. 8 is a diagram depicting another approach to view and compare multiple object set layers using various hand gestures.

FIG. 8 is a diagram depicting another approach to view and compare multiple object set layers using various hand gestures. View 800 shows object set layers 550 and 630. Object set layer 630 is superimposed over object set layer 550 and a user may view object set layer 550 by pressing and holding an area on object set layer 550 (layer selection gesture 810). View 820 shows that object set layer 550 comes to the "front" of object set layer 630 and the user may view objects included in object set layer 550. When the user's finger is released, device 300 returns the object set layers to their previous view (view 830). In one embodiment, device 300 may allow the user to rearrange the viewing order of the object set layers, such as when a user double taps on a particular object set layer to keep the object set layer in the front of the other object set layers.

In one embodiment, a layer may be selected based on the amount of pressure a user applies to the display (layer pressure gesture). For example, when moving an object between layers in combination with a pressure sensor, a lower layer is displayed by adding a pressure to an upper layer. Adding further pressure causes a still lower layer to be displayed, giving the user an impression as if diving into the layers and making the user aware of the overlapping layers.

Figure 9:
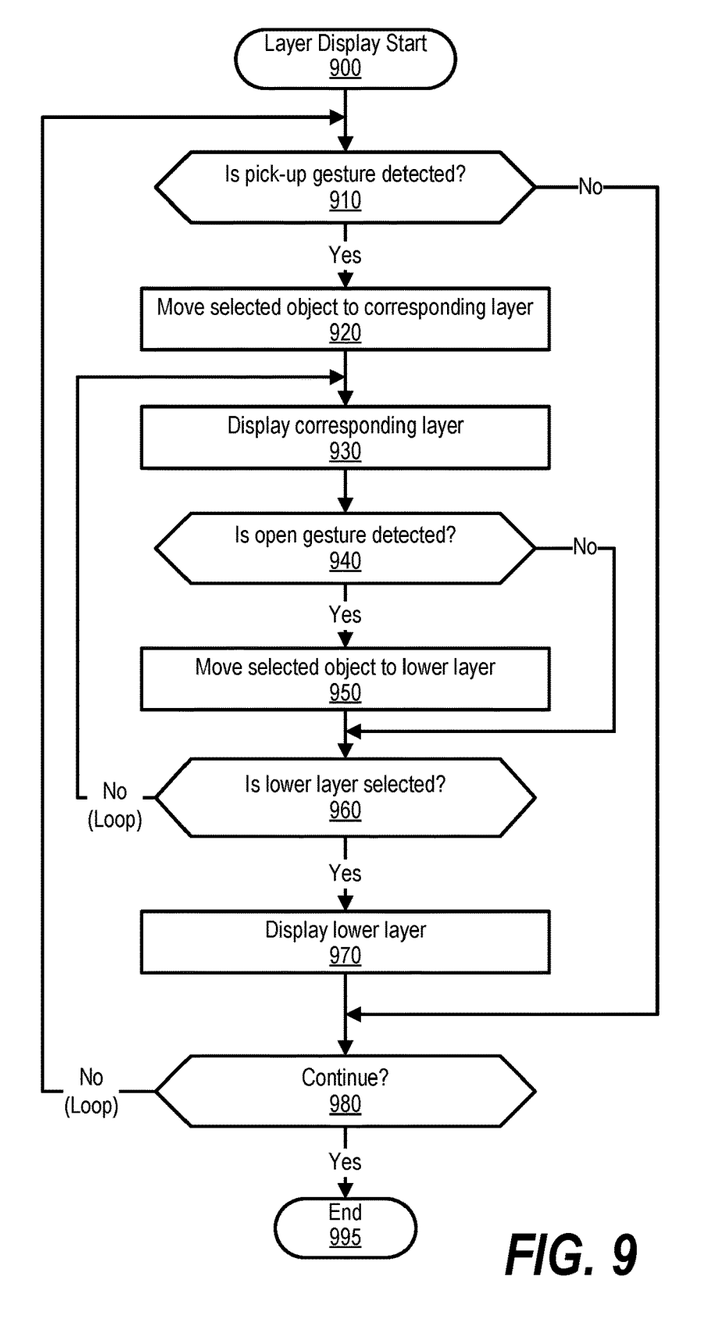
FIG. 9 is a flowchart showing steps taken to display layers according to a user's hand gestures.

FIG. 9 is a flowchart showing steps taken to display layers according to a user's hand gestures. FIG. 9 processing commences at 900 whereupon the process determines as to whether the user performed a pick-up gesture on an object (decision 910). If the pick-up gesture is not detected, then decision 910 branches to the 'no' branch bypassing layer creation and displaying steps.

On the other hand, if a pick-up gesture is detected, then decision 910 branches to the 'yes' branch. At step 920, the process moves the selected object to the corresponding object set layer (e.g., two pick-up commands indicate a second layer). At step 930, the process displays the corresponding layer. The process determines as to whether an open gesture is performed by the user on an object (decision 940). If an open gesture is not detected, then decision 940 branches to the 'no' branch. On the other hand, if an open gesture is detected, then decision 940 branches to the yes branch and the process moves (deregisters) the selected object to a lower layer (registers) (step 950).

The process determines as to whether a lower layer is selected (e.g., single tap, double tap, etc., decision 960). If a lower layer is not selected, then decision 960 branches to the 'yes' branch which loops back to continue displaying the higher layer over the lower layer. This looping continues until the user selects the lower layer, which may be a lower object set layer or primary layer 320 on display 310, at which point decision 960 branches to the 'yes' branch exiting the loop.

At step 970, the process displays the lower layer and determines as to whether to continue (decision 980). If the process should continue, then decision 980 branches to the 'yes' branch which loops back to monitor pick-up gestures and open gestures. This looping continues until the process should terminate, at which point decision 980 branches to the 'no' branch exiting the loop. FIG. 9 processing thereafter ends at 995.

In one embodiment, device 300 monitors a user's gestures for layer view gestures such as those shown in FIGS. 7 and 8 and adjusts how the object set layers are displayed (superimposed over each other) based on the user's layer view adjustments.

Figure 10:
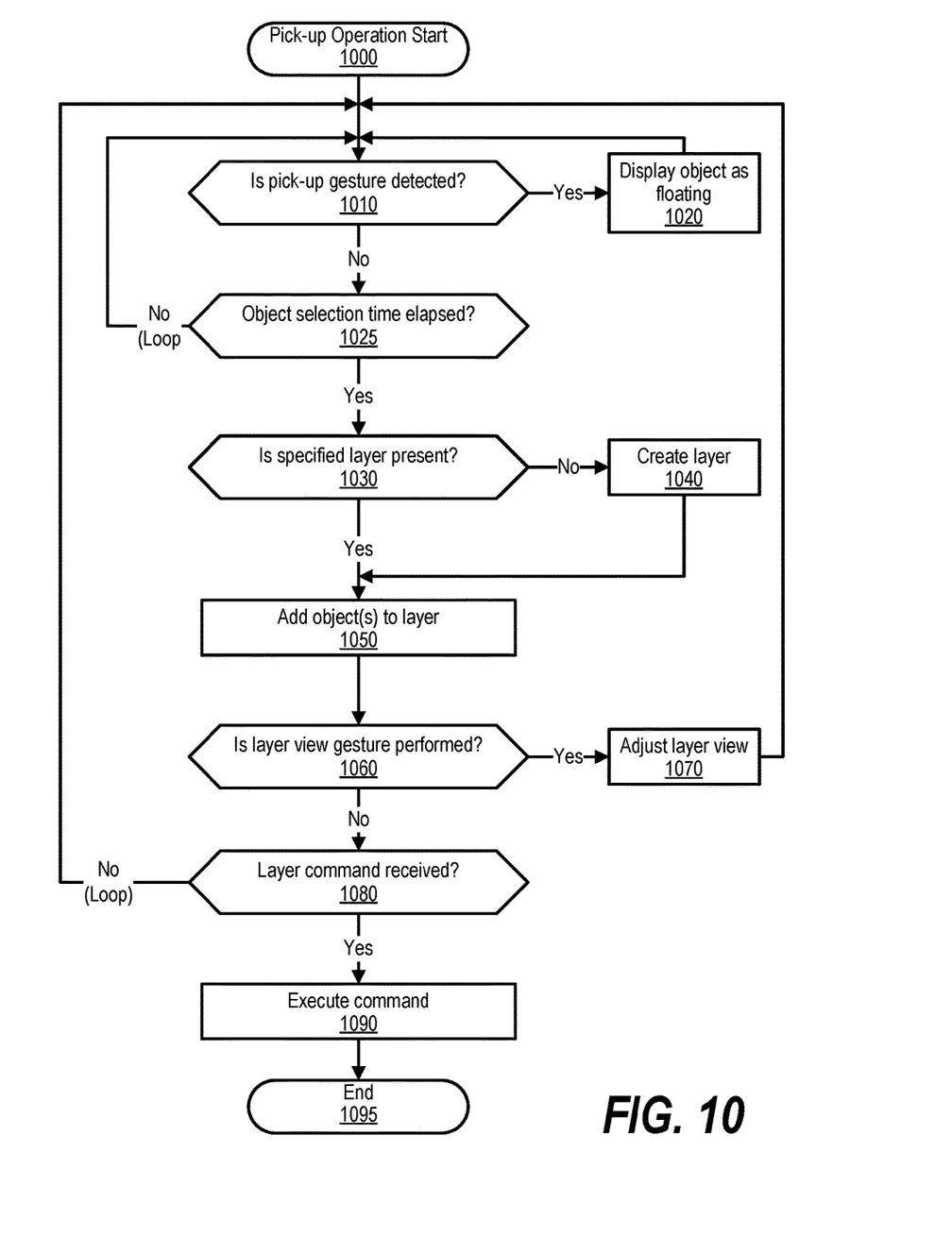
FIG. 10 is a flowchart showing steps taken to process a user's pick-up commands.

FIG. 10 is a flowchart showing steps taken to process a user's pick-up commands. FIG. 10 processing commences at 1000 whereupon the process determines as to whether the user performs a pick-up gesture (decision 1010). If a pick-up gesture is detected, then decision 1010 branches to the 'yes' branch whereupon, in one embodiment, the process displays the selected object as floating (decision 1020).

On the other hand, if a pick-up gesture is not detected, then decision 1010 branches to the 'no' branch. The process determines as to whether an object selection time has elapsed relative to a previous pick-up gesture by the user (decision 1025). For example, the process may allow the user to pick-up multiple objects within a particular timeframe, or a particular timeframe between each pick-up gesture, and register the multiple objects to the same object set layer. If the object selection time has not elapsed, then decision 1025 branches to the 'no' branch, which loops back to wait for another pick-up gesture. This looping continues until the object selection time has elapsed, at which point decision 1025 branches to the 'yes' branch.

The process determines as to whether the specified layer corresponding to the pick-up gesture is present (e.g., two pick-up gestures correspond to a second object set layer, decision 1030). If the specified layer is present, then decision 1030 branches to the 'yes' branch. On the other hand, if the specified layer is not present, then decision 1030 branches to the 'no' branch whereupon, at step 1040, the process creates the layer.

At step 1050, the process adds (registers) the object(s) to the layer. The process determines as to whether the user performs a layer view gesture, such as those shown in FIGS. 7 and 8 (decision 1060). If the user performs a layer view gesture, then decision 1060 branches to the 'yes' branch whereupon the process adjusts the layer view accordingly. On the other hand, if the user does not perform a layer view gesture, the decision 1060 branches to the 'no' branch.

The process determines as to whether the user performs a layer command, such as deleting the layer and objects within the layer (decision 1080). If the user does not perform a layer command, then decision 1080 branches to the 'no' branch, which loops back to continue monitoring user gestures. This looping continues until the user performs a layer command, at which point decision 1080 branches to the 'yes' branch. At step 1090, the process executes the layer command that, in one embodiment, is performed on each of the objects within the layer. FIG. 10 processing thereafter ends at 1095.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   in response to receiving a first selection of a first object from a plurality of objects that are each displayed on a first display layer of a display, displaying the first object on a second display layer of the display;
   in response to receiving a second selection of a second object from the plurality of objects displayed on the first layer, displaying the second object on a third display layer of the display, wherein the third display layer is different than the first display layer and the second display layer; and
   performing an action on the first object included in the second layer in response to receiving a layer command, wherein the second object is maintained on the third display layer in response to the action.

2. The method of claim 1 further comprising:
   in response to a user contacting the display, identifying a first user contact point and a second user contact point on the first display layer in proximity to the first object;
   detecting that the first user contact point and the second user contact point are moving in a direction towards each other;
   determining that the user performed a pick-up gesture on the first object in response to detecting that the first user contact point and the second user contact point are moving in a direction towards each other; and
   registering the first object to the second display layer in response to determining that the user performed the pick-up gesture, wherein the displaying of the first object on the second display layer is in response to the registering of the first object to the second display layer.

3. The method of claim 2 further comprising:
   detecting a first occurrence and a second occurrence of the pick-up gesture on the second object; and
   registering the second object to the third display layer in response to detecting the first occurrence and the second occurrence of the pick-up gesture.

4. The method of claim 1 further comprising:
   in response to a user contacting the display, identifying a first contact point and a second contact point on the third display layer in proximity to the second object;
   in response to detecting that the first contact point and the second contact point are moving in a direction away from each other, moving the second object from the third display layer to the second display layer.

5. The method of claim 1 further comprising:
   detecting that a user performed a third selection of a third object from the plurality of objects within an object selection time from the selection of the first object;
   registering the third object to the second display layer; and
   displaying the third object with the first object on the second display layer.

6. The method of claim 5 further comprising:
   performing the action to the second display layer, resulting in the action being performed on both the first object and the third object.

7. The method of claim 1 wherein:
   the second display layer is superimposed over the first display layer on the display; and
   the third display layer is superimposed over the second display layer on the display.

8. The method of claim 7 further comprising:
   detecting a layer view gesture performed by the user on the display; and
   exposing at least a portion of the third display layer over the second display layer on the display.

9. The method of claim 8 wherein the layer view gesture is selected from the group consisting of a layer lift gesture, a layer reduction gesture, a layer pressure gesture, and a layer selection gesture.

10. The method of claim 1 further comprising:
    positioning the first object on the second display layer relative to an first initial location of the first object on the first display layer; and
    positioning the second object on the third display layer relative to a second initial location of the second object on the first display layer.

11. An information handling system comprising:
    a display;
    one or more processors;
    a memory coupled to at least one of the processors; and
    a set of computer program instructions stored in the memory and executed by at least one of the processors in order to perform actions of:
       in response to receiving a first selection of a first object from a plurality of objects that are each displayed on a first display layer of the display, displaying the first object on a second display layer of the display;
       in response to receiving a second selection of a second object from the plurality of objects displayed on the first layer, displaying the second object on a third display layer of the display, wherein the third display layer is different than the first display layer and the second display layer; and
       performing an action on the first object included in the second layer in response to receiving a layer command, wherein the second object is maintained on the third display layer in response to the action.

12. The information handling system of claim 11 wherein at least one of the one or more processors perform additional actions comprising:
    in response to a user contacting the display, identifying a first user contact point and a second user contact point on the first display layer in proximity to the first object;
    detecting that the first user contact point and the second user contact point are moving in a direction towards each other;
    determining that the user performed a pick-up gesture on the first object in response to detecting that the first user contact point and the second user contact point are moving in a direction towards each other; and
    registering the first object to the second display layer in response to determining that the user performed the pick-up gesture, wherein the displaying of the first object on the second display layer is in response to the registering of the first object to the second display layer.

13. The information handling system of claim 12 wherein at least one of the one or more processors perform additional actions comprising:
    detecting a first occurrence and a second occurrence of the pick-up gesture on the second object; and
    registering the second object to the third display layer in response to detecting the first occurrence and the second occurrence of the pick-up gesture.

14. The information handling system of claim 11 wherein at least one of the one or more processors perform additional actions comprising:

in response to a user contacting the display, identifying a first contact point and a second contact point on the third display layer in proximity to the second object;

in response to detecting that the first contact point and the second contact point are moving in a direction away from each other, moving the second object from the third display layer to the second display layer.

15. The information handling system of claim 11 wherein at least one of the one or more processors perform additional actions comprising:

detecting that a user performed a third selection of a third object from the plurality of objects within an object selection time from the selection of the first object     registering the third object to the second display layer;

displaying the third object with the first object on the second display layer; and     performing the action to the second display layer, resulting in the action being performed on both the first object and the third object.

16. A computer program product stored in a computer readable storage medium, comprising computer program code that, when executed by an information handling system, causes the information handling system to perform actions comprising:

in response to receiving a first selection of a first object from a plurality of objects that are each displayed on a first display layer of a display, displaying the first object on a second display layer of the display;

in response to receiving a second selection of a second object from the plurality of objects displayed on the first layer, displaying the second object on a third display layer of the display, wherein the third display layer is different than the first display layer and the second display layer; and     performing an action on the first object included in the second layer in response to receiving a layer command, wherein the second object is maintained on the third display layer in response to the action.

17. The computer program product of claim 16 wherein the information handling system performs additional actions comprising:

in response to a user contacting the display, identifying a first user contact point and a second user contact point on the first display layer in proximity to the first object;

detecting that the first user contact point and the second user contact point are moving in a direction towards each other;

determining that the user performed a pick-up gesture on the first object in response to detecting that the first user contact point and the second user contact point are moving in a direction towards each other; and     registering the first object to the second display layer in response to determining that the user performed the pick-up gesture, wherein the displaying of the first object on the second display layer is in response to the registering of the first object to the second display layer.

18. The computer program product of claim 17 wherein the information handling system performs additional actions comprising:

detecting a first occurrence and a second occurrence of the pick-up gesture on the second object; and     registering the second object to the third display layer in response to detecting the first occurrence and the second occurrence of the pick-up gesture.

19. The computer program product of claim 16 wherein the information handling system performs additional actions comprising:

in response to a user contacting the display, identifying a first contact point and a second contact point on the third display layer in proximity to the second object;

in response to detecting that the first contact point and the second contact point are moving in a direction away from each other, moving the second object from the third display layer to the second display layer.

20. The computer program product of claim 16 wherein the information handling system performs additional actions comprising:

detecting that a user performed a third selection of a third object from the plurality of objects within an object selection time from the selection of the first object     registering the third object to the second display layer;

displaying the third object with the first object on the second display layer; and     performing the action to the second display layer, resulting in the action being performed on both the first object and the third object.

\* \* \* \* \*